United States Patent [19]
Ventre et al.

[11] 3,795,414
[45] Mar. 5, 1974

[54] INFLATABLE SAFETY DEVICES FOR PROTECTING THE DRIVERS OF MOTOR VEHICLES

[75] Inventors: Pierre Ventre; Jacques Lacambre, both of Billancourt, France

[73] Assignees: Regie Nationale Des Usines Renault, Billancourt; Automobiles Peugeot, Paris, both of, France

[22] Filed: Nov. 8, 1971

[21] Appl. No.: 196,417

[30] Foreign Application Priority Data
Nov. 19, 1970 France .............................. 70.41537

[52] U.S. Cl... 280/150 AB, 280/87 R, 206/DIG. 30, 5/348 R
[51] Int. Cl. ........................................... B60r 21/08
[58] Field of Search ......... 280/150 AB, 87 R, 87 A; 297/DIG. 3; 5/348 R, 348 WB; 182/137, 138, 139; 206/DIG. 30

[56] References Cited
UNITED STATES PATENTS

| | | | |
|---|---|---|---|
| 3,476,402 | 11/1969 | Wilfert | 280/150 AB |
| 3,675,942 | 7/1972 | Huber | 280/150 AB |
| 3,618,979 | 11/1971 | Gulette | 280/150 AB |
| 3,642,303 | 2/1972 | Irish | 280/150 AB |
| 3,125,377 | 3/1964 | Bridges | 182/138 |
| 3,095,947 | 7/1963 | Beaulaurier | 182/139 |
| 2,974,912 | 3/1961 | Namsick | 244/138 R |
| 3,603,430 | 9/1971 | Kendall | 182/137 |
| 3,580,603 | 5/1971 | Chute | 280/150 AB |

*Primary Examiner*—David Schonberg
*Assistant Examiner*—John P. Silverstrim
*Attorney, Agent, or Firm*—Stevens, Davis, Miller & Mosher

[57] ABSTRACT

This safety device comprises an inflatable air-bag interposed between the passenger and one portion of the passenger compartment of a vehicle, wherein the surface portion of the air-bag which is to engage the passenger in case of crash forms an acute dihedral angle with a vertical plane of reference.

The aforesaid dihedral angle is directed forwards in relation to the passenger, and the interior of the surface portion of the bag which is to engage the passenger in case of crash is subjected to two unequal fluid pressures of which the highest is exerted at least in the air-bag portion nearest to the passenger.

4 Claims, 8 Drawing Figures

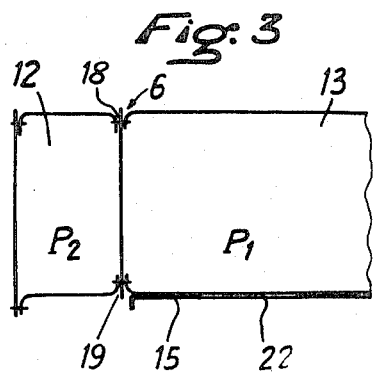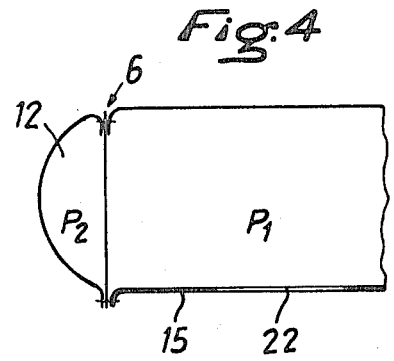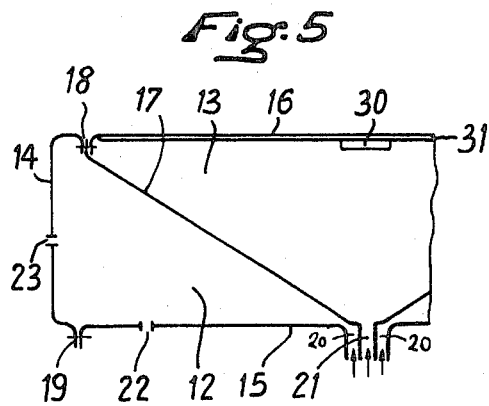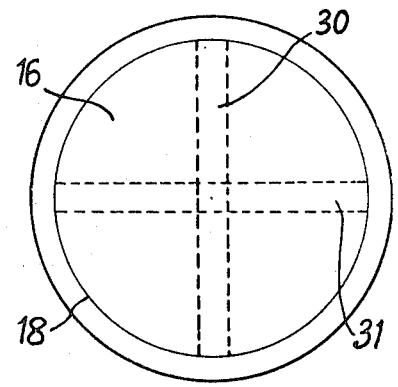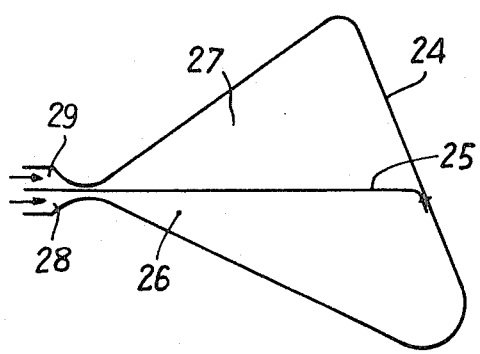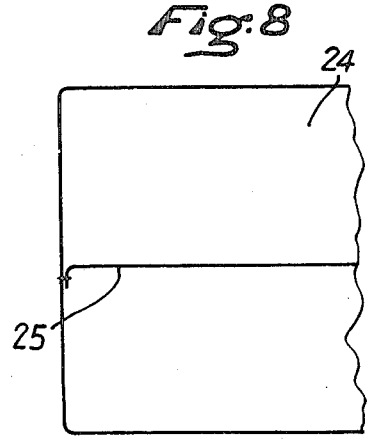

INFLATABLE SAFETY DEVICES FOR PROTECTING THE DRIVERS OF MOTOR VEHICLES

The present invention relates in general to safety devices for protecting the drivers of motor vehicles, and possibly the passengers, in case of crash, and has specific reference to a safety device comprising an inflatable flexible bladder or bag, normally kept in a folded or flat condition, but adapted to be inflated at the proper time for preventing shocks from occuring between the passengers and the inner portions of the passenger compartment.

Safety devices of this character have already been incorporated in a wall secured to the passenger compartment, in order to protect the passengers of a motor vehicle, said wall being an integral part of the inner structure of the vehicle. Means co-acting with this wall, which may be for example an element of the instrument panel, facia board or a seat, are adapted to move said wall from its point of fixation towards the passenger of the vehicle in order to protect the passenger during a crash. To protect the driver, equivalent means must be mounted in the steering wheel or in the hub thereof. Thus, shock absorbing means have been incorporated in this fashion in the hub of the steering wheel in order to protect the driver's chest and developing a shock-receiving surface above the plane containing the rim of the steering wheel.

In a prior patent application Ser. No. 157,461, filed in U.S.A. by Ousset on June 28, 1971, now U.S. Pat. No. 3,744,817, a safety device is described which comprises a flexible inflatable bladder or air-bag disposed within the surface area described by anyone of the radial arms or spokes connecting the rim of the steering wheel to the tubular hub thereof.

Obviously, independently of the problems arising from the responsive time and inflation rate of the bladder or air-bag, the efficiency of the device is subordinate to the properties of this bladder which must dissipate the kinetic energy imparted to the passenger or driver without exerting excessive local stress on him.

Since the mass of a passenger sitting in a vehicle comprises a plurality of secondary masses consisting of the head, the trunk, the pelvis and the legs, the path of the passenger in his compartment depends on the position occupied by him just before the crash.

Since the various parts of the body have different physiological strength values, all these parameters must be carefully taken into account in the construction of the bladder capable of operating efficiently in case of crash.

The hitherto known devices are attended by a number of inconveniences depending on their generally spherical shape and also on the gas pressure in the bladder.

It was observed that in a crash the passengers of a vehicle strike the bladder under disadvantageous conditions. This is due mainly to the fact that the point of application of the effort to the bladder is abnormally high, so that the considerable masses lying at lower levels cause the passenger to slip beneath the assembly constituting the retaining device.

On the other hand, a close analysis of the body movements during a crash revealed that even if the trunk movements are damped out by the inflated bladder or air-bag, the passenger's head is exposed to a fore-and-aft movement most likely to produce a shell-shock followed by a loss of consciousness or even by death, according as this movement is more or less accelerated.

In a first phase, the head is thrown against the inflated bag and since its mass is inferior to the other mass constituting the human body, the head is subsequently thrown backwards. During this movement the brain and the cerebellum are thrown against the occiput, thus involving a strain and possibly a rupture of the cortico-meningeal veins.

This invention is directed to means for retaining the various portions of the body of a passenger in case of crash in a motor vehicle.

This invention is also concerned with an inflatable air-bag or bladder wherein the portion designed for engaging the passenger's head is subjected to a relatively low gas pressure.

Another object of this invention is to provide a specific arrangement of the inflatable air-bag or bladder, with a view to prevent the passenger from slipping under the retaining device.

To this end, the device according to this invention comprises a surface portion of the inflatable bladder or air-bag which is designed for engaging the passenger and forms an acute dihedral angle with a vertical reference plane, said device being characterized in that said dihedral angle is directed forward away from the passenger, and that the interior of said surface portion intended for engaging the passenger is responsive to two unequal fluid pressures of which the highest is exerted at least in the bladder portion nearest to the passenger.

In this device, the inflatable bladder or air-bag is adapted to engage efficiently the thighs and pelvis of the passenger, thus positively preventing him from slipping forwards.

Since the centers of gravity of the masses consisting of the head and trunk lie below the lower peripheral area of the contact surface, the head is gradually sunk into the bladder and thus the fore-and-aft movement of the head is safely prevented.

Thus, the lower portion of the passenger's body is positively locked by the bladder portion receiving the highest inflating pressure and the movement of the upper portion of the trunk and head are absorbed in a zone of contact responsive to the lowest inflating pressure.

Other features and advantages of this invention will appear as the following description proceeds with reference to the accompanying drawing illustrating diagrammatically by way of example typical forms of embodiment thereof. In the drawing :

FIGS. 3, 4 and 5 are fragmentary diagrammatic sectional views of the inflatable bladder or air-bag ;

FIG. 6 is a plan view from above showing the portion of the inflatable air-bag which registers with the passenger ;

FIG. 7 is a sectional view illustrating a modified form of embodiment of the inflatable bladder, and FIG. 8 is a front view of the bladder provided for engaging the passenger according to the form of embodiment illustrated in FIG. 7.

Figure 1:
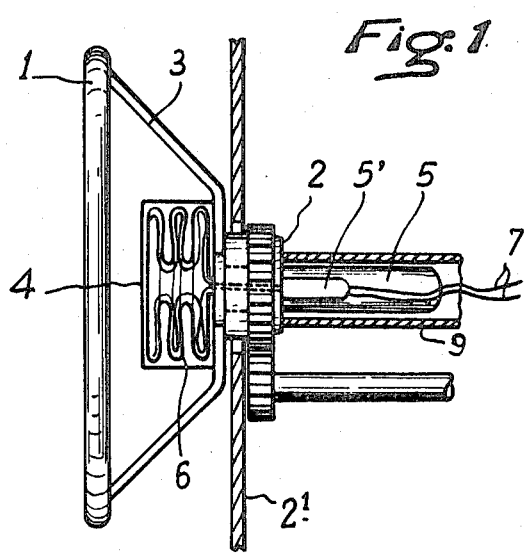
FIG. 1 is a general view of the device in its folded or inoperative position.

Referring first to FIG. 1, the steering wheel has its rim 1 connected to a tubular hub 2 rotating in a partition $2^1$ through a pair of spokes 3 shaped to leave between these and beyond the hub 2 a space within the steering wheel in which the safety device 4 is disposed, this device comprising essentially a pair of inflating cartridges 5, 5' and an inflatable bladder or air-bag 6 (shown in its folded condition in FIG. 1). Conductors 7 enclosed in a fixed tubular support 9 connect the cartridges 5, 5' to a detector (not shown) which is no part of this invention.

It may be noted that this detector is adapted to tramsmit for example an electric signal in case of crash or very strong deceleration of the vehicle, for firing an explosive charge and thus causing the inflating cartridges 5, 5' to be opened.

Figure 2:
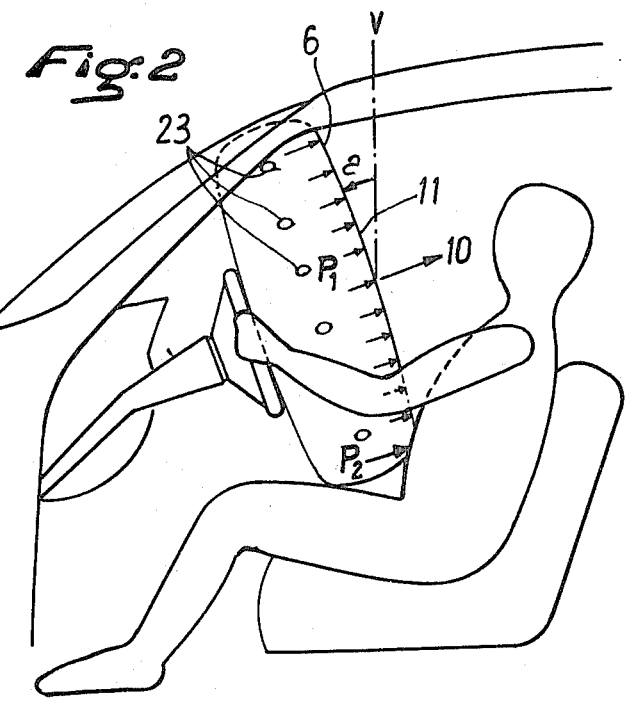
FIG. 2 is a general view showing the device in its unfolded or operative position.

As illustrated in FIGS. 1 and 2, when the vehicle is stationary or driven under normal conditions, the airbag 6 is folded to form a compact body. In case of crash, the detector causes the cartridges 5, 5' to inflate the air-bag 6 in an expansion direction 10 (FIG. 2). The surface portion 11 engaging the passenger forms a dihedral angle $a$ with a vertical reference plane V.

According to a specific feature of this invention the dihedral angle $a$ is directed towards the front of the vehicle and the surface portion 11 is subjected to two unequal fluid pressures $P_1$ and $P_2$. The highest pressure, namely $P_2$, is exerted against the outer periphery of surface portion 11.

In FIGS. 3 and 4, the air-bag 6 comprises two chambers 12 and 13. Chamber 12 constitutes a peripheral ring-shaped capacity inflated at pressure $P_2$. The other chamber 13 of generally cylindrical configuration is inflated at a pressure $P_1$ such that $P_1 < P_2$. It will be noted that chamber 12 may have a circular or semi-circular cross-section, or any other suitable geometric shape.

According to another feature characterizing this invention the central portion of the bladder or air-bag 6 is at the atmospheric pressure. In this case the central partition acts as a simple membrane or diaphragm tensioned automatically in relation to the walls of the peripheral chamber during the inflation of this last-named chamber at said pressure $P_2$.

In FIGS. 5 and 6, it may be seen that the peripheral chamber 12 is a triangular-sectioned ring consisting of a strip 14 of material sewn to a pair of disks 15 and 16 of the same material. The inner partition 17 dividing the space into two chambers 12 and 13 is frustoconical with its major base made of a disk 16 of material facing the passenger. The partition 17 is secured by seams 18 to the disk 16 of material. The strip 14 is secured to the other elements of the bag by means of other seams 18 and 19. The seam 18 lies preferably within the air-bag to prevent the frictional contact thereof with the passenger in case of crash.

The pressure differential obtaining in chambers 12 and 13 is due to a suitable arrangement of the inflating cartridges 5 and 5', and of the gas supply pipes 20 and 21 opening into chambers 12 and 13 respectively. The disk 15 and the strip of material 14 comprise orifices 22 and 23, respectively, for connecting the chamber 12 to the surrounding atmosphere. These orifices are gauged as a function of the desired deflating output.

In this example, it is essential that the central portion consisting of the disk 16 of material should not become abnormally bulged when the bag is inflated and under pressure. In fact, a domed surface would modify the contact area between the passenger and the bag while increasing the actual volume of this bag. Thus, with a constant volume of gas delivered by the cartridge a pressure lower than the desired value may be obtained. This problem may be solved by incorporating in the bag means capable of imparting the ideal shape thereto in the inflated condition; thus, two strips 30 and 31 of a material preferably stiffer than the bag material and cut to a length slightly inferior to the bag diameter may be sewn to the upper circular wall.

FIGS. 7 and 8 illustrate another form of embodiment of the inflatable air-bag intended more particularly for the passenger of a vehicle. The surface portion 24 of the inflatable bag which is to engage the passenger constitutes a rectangular face of a triangular-sectioned prism. The volume of this prism comprises two juxtaposed compartments 26 and 27 having a common partition 25. This partition is substantially horizontal and secant to the rectangular face. Compartments 26 and 27 are supplied with gas through pipes 28 and 29, respectively. The gas pressure in compartment 26 is greater than that produced in compartment 27.

Each volume of this air-bag comprises exhaust orifices (not shown) gauged to adhere to the selected law of variation of the gas output during the bag deflation. Under these conditions, it is clear that the bag should be manufactured in such a way that in the inflated condition it can assume the position theoretically expected for ensuring an efficient protection of the passengers of a motor vehicle.

Although a few forms of embodiment have been described and illustrated herein by way of example, it will be readily apparent to those conversant with the art that various modifications may be brought thereto without departing from the basic principle of the invention as set forth in the appended claims.

What is claimed as new is:

1. A device for retaining the passengers of a vehicle and protecting them in case of a crash comprising:
    a cylindrical inflatable air-bag interposed between the passenger and one portion of the vehicle compartment, said air-bag having a peripheral ring-shaped chamber which first engages the passenger being retained and which is adapted to be inflated at a high pressure and an independent central cylindrical chamber adapted to be inflated separately at a lower pressure,
    said air-bag having a surface which engages the passenger, said surface being directed forward of a reference vertical plane and forming an acute dihedral angle with said vertical reference plane, and
    means to simultaneously and separately inflate said peripheral chamber at a higher pressure than said central chamber.

2. A device according to claim 1, wherein the inflated central chamber has a frustoconical configuration with its major base directed towards the passenger of the vehicle.

3. A device according to claim 1, wherein the lowest pressure is equal to atmospheric pressure.

4. A device for retaining the passengers of a vehicle and protecting them in case of a crash comprising:
    a cylindrical inflatable air-bag interposed between the passenger and one portion of the vehicle compartment.
    said air-bag having a peripheral ring-shaped chamber which first engages the passenger being retained and which is adapted to be inflated at a pressure greater than atmospheric pressure and an independent central cylindrical chamber adapted to be inflated separately at atmospheric pressure and having a frustoconical configuration with its major base directed towards the passenger of the vehicle when inflated, said air-bag having a surface which engages the passenger, said surface being directed forward of a reference vertical plane and forming an acute dihedral angle with said vertical reference plane, means to simultaneously and separately inflate said peripheral chamber and said central chamber, and strips adapted to impart an ideal shape thereto when inflated, so as to compensate the effect of an excessive pressure of the fluid in the chamber.

* * * * *